Sept. 3, 1968          J. H. GRAY          3,399,518

TRASH-REMOVAL SYSTEM

Filed March 24, 1965          2 Sheets-Sheet 1

INVENTOR
JAMES H. GRAY

ATTORNEYS

Sept. 3, 1968 J. H. GRAY 3,399,518
TRASH-REMOVAL SYSTEM
Filed March 24, 1965 2 Sheets-Sheet 2

INVENTOR
JAMES H. GRAY
BY McLaughlin, Cahill & Drummond
ATTORNEYS

United States Patent Office 3,399,518
Patented Sept. 3, 1968

3,399,518
TRASH-REMOVAL SYSTEM
James H. Gray, 3411 E. Gold Dust,
Phoenix, Ariz. 85028
Filed Mar. 24, 1965, Ser. No. 442,308
9 Claims. (Cl. 56—28)

ABSTRACT OF THE DISCLOSURE

A trash-removal system utilizing a plurality of rotatable substantially circular trash-removal members extending between cotton grasping belts for engaging trash carried by belts and lifting the trash from the grip of the belts.

---

The present invention pertains to improved trash removal systems, and more particularly to apparatus for separating trash from cotton in a cotton gleaner.

Cotton harvesters of the type designed to retrieve cotton that has been knocked to the ground during harvesting are generally known as cotton gleaners. When retrieving cotton that has been knocked to the ground, the cotton is usually mixed with debris in the form of grass, sticks, dirt, or the like. Separating grass or flexible debris from cotton may be a particular problem since, unlike dry sticks and relatively brittle debris, the flexible debris cannot be crushed and thereby separated from the cotton tufts without injury to the cotton.

It is an object of the present invention to provide improved means for separating flexible debris from down cotton.

It is another object of the present invention to provide improved means for removing trash that has been retrieved by a cotton gleaner.

It is a further object of the present invention to remove trash from cotton that has been retrieved from the ground and dispose of the trash without injury to the cotton.

Other objects and advantages of my invention will become apparent to those skilled in the art in the course of the following specification and claims when taken in light of the accompanying drawings.

In accordance with one embodiment of my invention, I provide a plurality of rotatable trash-removal members that extend between cotton grasping or gripping means to force trash and debris away from the cotton tufts. Cotton gleaners of the type described here utilize belts or pliant cotton-retrieving members for grasping the individual cotton tufts or bowls that have fallen to the ground after harvesting. These belts transport the retrieved cotton tufts and transfer the tufts to a second transporting means. To prevent trash and debris from being carried by the cotton-gripping means, the rotatable trash-removal members extend between the belts so that debris, such as grass, or the like, being carried by two or more of the belts contacts the rotatable member or members. Flexible debris, carried by one or more of the cotton-gripping means, contacts the rotatable trash-removal member or members and is gently lifted from the cotton-gripping means by the rotation of the removal member with minimal rubbing friction between the debris and the removal member.

A better understanding of my invention may be obtained in light of the accompanying drawings in which.

Figure 1:
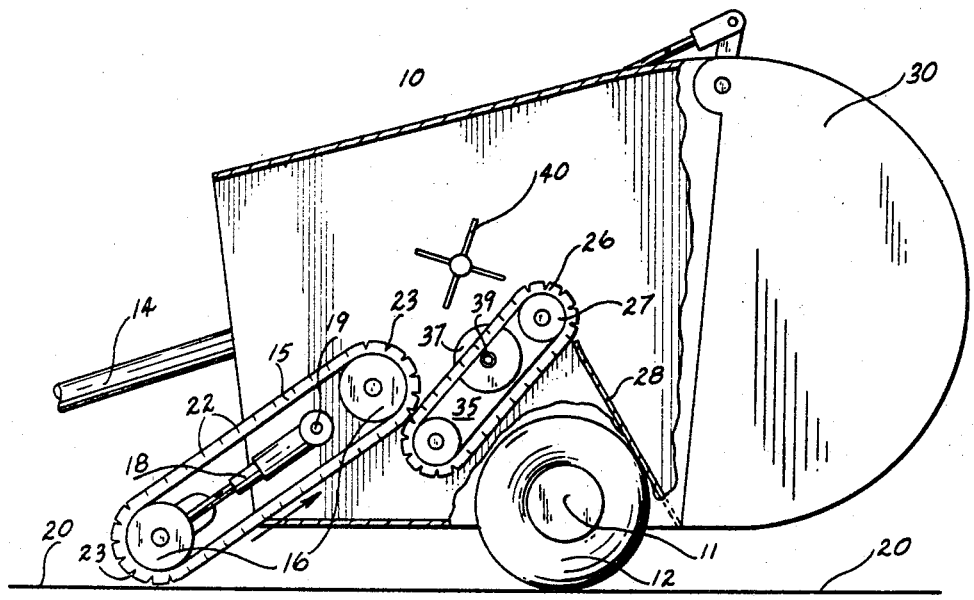
FIGURE 1 is an elevation, with portions removed for clarity, illustrating a cotton gleaner having a trash-removal system constructed in accordance with my invention.

With reference particularly to FIGURE 1, the cotton gleaner shown may be of the type shown and described in United States Patent No. 2,670,584. In general, the cotton gleaner illustrated in FIGURE 1 includes a base member 10 which supports a wheel 11 having a tire 12 mounted thereon. An arm 14 or other connecting means permits the gleaner to be pulled by a tractor or other vehicle for transportation over a cotton field. The gleaner includes a plurality of pliant belts 15 which extend over pairs of pulleys 16. The pliant belt is kept taut by an appropriate belt-tightener arrangement 18 such as telescoping rods pivoted about a shaft 19, or the like. The pliant belts 15 ride on the ground 20 and are driven thereby. Pliant belts 15 also contain transverse slots 22 which open to form V-shaped slots 23 when the respective belts pass over their pulleys. Since the V-shaped slots 23 open and close as the belts pass over their respective pulleys, the portion of the belt in contact with the ground will grasp cotton tufts or bowls on the ground and transport the tufts in the direction shown by the arrow. As the belt flexes over the second pulley and the slots open, the tufts are released onto a second belt-and-pulley arrangement 35. The second belt-and-pulley arrangement 35 operates in a manner similar to that described in connection with the previous belt and pulleys except that motive force for the second set of belts and pulleys does not come from the ground 20 directly. The motive force for the second set of belts and pulleys 35 is desirably obtained through a set of chain and sprocket means connected with the first set of belts and pulleys adapted to make the speed of the second belt-and-pulley arrangement correspond to that of the first belt-and-pulley arrangement. Alternatively, an independent source of power could be applied to the second belt-and-pulley arrangement. In the second belt-and-pulley arrangement 35, the belt slots open and close as the belt passes over the pulleys and the slots grasp cotton tufts as they are provided by the first belt-and-pulley arrangement. The second belts 26 pass over the second set of pulleys 27 and the corresponding slots open, the cotton is thrown centrifugally into a chute 28 for storage in a bin 30. Bin 30 is adapted by appropriate means to be opened for removal of cotton therefrom.

Figure 3:
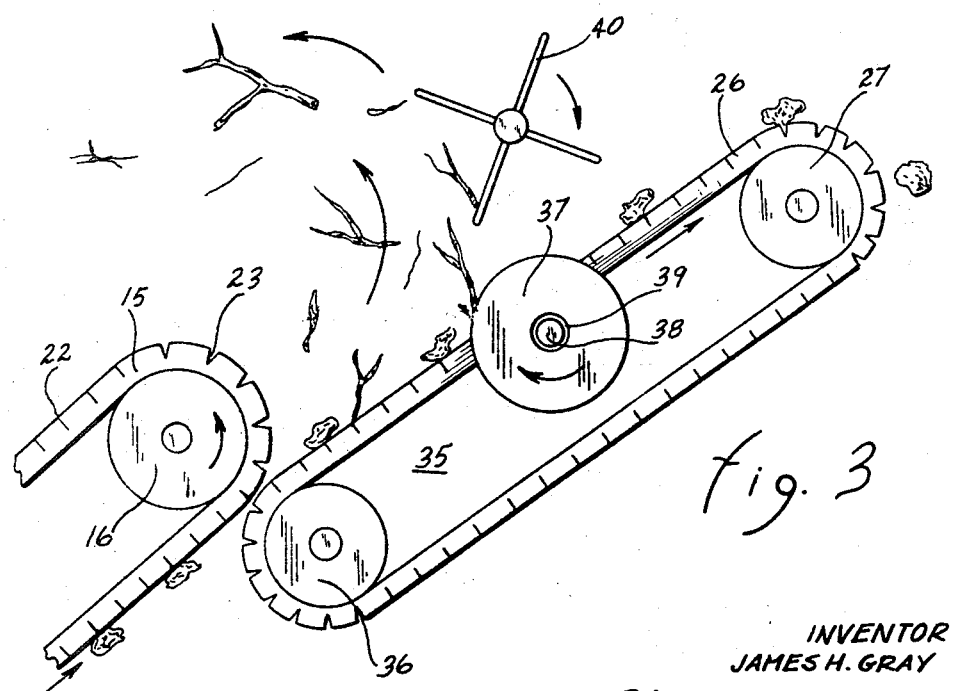
FIGURE 3 is an enlarged portion of the cotton gleaner illustrated in FIGURE 1 particularly showing a trash-removal system in accordance with my invention.
Figure 2:
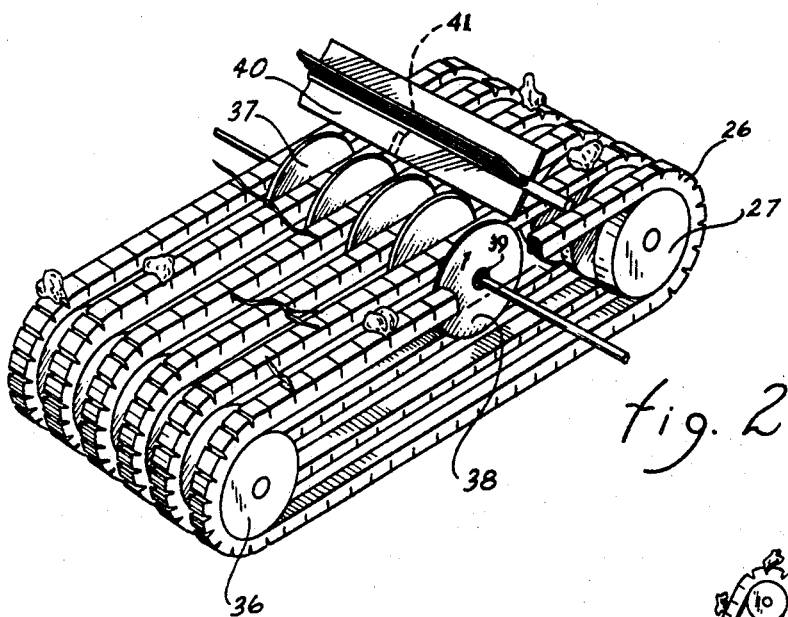
FIGURE 2 is an isometric view of a trash-removal system constructed in accordance with the teachings of my invention.

FIGURES 2 and 3 are enlarged views more particularly illustrating details of the second belt-and-pulley arrangement 35 discussed previously in connection with FIGURE 1. As shown by FIGURE 2, a plurality of cotton-gripping means or belts 26 are shown spaced transversely from each other and each mounted over a corresponding pair of pulleys 27 and 36. As the belts travel in the direction indicated by the arrow, the transverse slots open and cotton tufts delivered to the second belt by the first belt are grasped by said second belt.

Trash and debris are picked up from the ground along with bowls or tufts of cotton. This trash and debris travel along with the cotton and a certain portion thereof is transferred to the second series of belts. A plurality of rotatable trash-removal members 37 in the form of substantially flat discs extend between the belts and into the path of trash carried thereby. Preferably, the trash-removal members have a common axis of rotation in the form of a support rod 38 and rotate as a unit. For proper operation, the axis of rotation of each rotatable trash-removal member should be positioned so that the chord formed by the belt member in the plane of the trash-removal member is less than the diameter of said rotatable trash-removal member 37. In my preferred embodiment, rotation of trash-removal members 37 is induced by the underside of the belt contacting the support axle 38 or a hub 39. Thus, the rotation of the trash-removal members corresponds to the belt speed. Trash carried by two or more of the belts 26 engages at least one rotatable trash-removal member 37 which rotates about its axis in the direction shown by the arrow. As the trash-removal member or members rotate, the trash or debris is lifted in an arcuate path from the belt-gripping means. Because the trash-removal member rotates with the trash or debris, rubbing friction between the removal member and the trash is substantially minimized. Thus, breakage or tearing of the trash which commonly occurs in other devices is substantially obviated.

As trash is gently lifted from the gripping means on belts 26 by the rotation of the trash-removal members 37, the trash-throwing member, such as a beater or paddle wheel 40, rotating as shown in FIGURE 3, throws the trash or debris away from the cotton-gripping belt onto any convenient conveyance for disposing of the trash. If desired, the trash-throwing member 40 may be notched as at 41 whereby the trash-throwing member and the rotatable trash-lifting members may be substantially interdigitated. Removal of thrown trash may be accomplished by any desired means. One such means would be to have the trash thrown onto the top of the first set of belts and thereby returned to the ground. This would, of course, present the trash to the initial pickup belts with the possibility that it could be returned to the lifting members a second or third time. This could prove beneficial in that cotton inadvertently thrown with the trash would also be picked up a second time with an enhanced recovery thereof. Another method of trash disposal would be to provide a tray, bin, or other receptive means to receive the thrown trash and maintain it separate from the gleaned cotton.

In operation, the cotton gleaner illustrated in FIGURES 1–3 is pulled by a tractor or other vehicle connected to the bar 14. As the gleaner travels, the first belt-and-pulley assembly travels along the ground and moves in the direction shown by the arrow. Cotton is grasped by the notches 23 and moves upwardly on the bottom side of the belt 15. An amount of trash or other debris is also picked up by the belt 15 and travels along with the gleaned cotton. When the cotton has moved to the upper end of the first belt-and-pulley arrangement and the slots 22 begin to open, some of the trash will be automatically dropped and some will travel along with the cotton presented to the second set of belts and pulleys 35. The rotation of the second set of belts is in a direction opposite that of the first set of belts so that the cotton is transported along the top surface thereof. Trash or other debris bridging the interbelt spaces in the second set of belts and pulleys contacts at least one rotatable trash-removal member and is gently lifted from its gripping belts thereby. The trash thrower 40 propels the lifted trash onto the top of the first set of belts and is carried downwardly and deposited on the ground. The method of trash disposal once the trash has been thrown is not critical.

Figure 4:
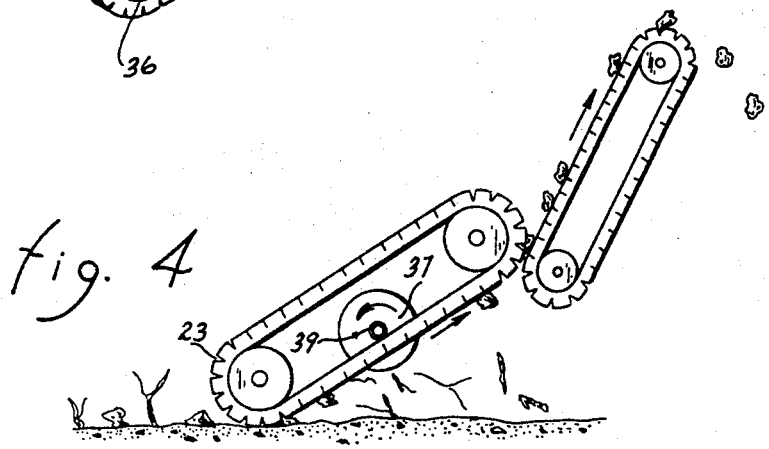
FIGURE 4 is a partial elevation illustrating another embodiment of my invention.

FIGURE 4 illustrates another embodiment of my invention in which rotatable trash-removal members are positioned between belts in the first or lower set of belt-and-pulley arrangements. As is apparent from the drawings, the rotatable trash-removal members extend downwardly into the path of trash held by two or more belts of the first belt-and-pulley arrangement. Trash is lifted from the belts in a downward fashion as the trash-removal members are rotated by the belts engaging the axle or a hub 39 on the axle. When the trash has been removed from the grip of the belts, it simply drops to the ground behind that portion of the belt 15 which has V-shaped notches 23 open to accept down cotton. In this embodiment, gravity takes the place of the trash-throwing member required when my rotatable trash-removal member is employed with the second set of belts and pulleys. Again, the sector of the trash-removal member extending the cotton and trash carrying portion of the belt must define a chord less than the diameter of the trash-throwing member.

Figure 5:
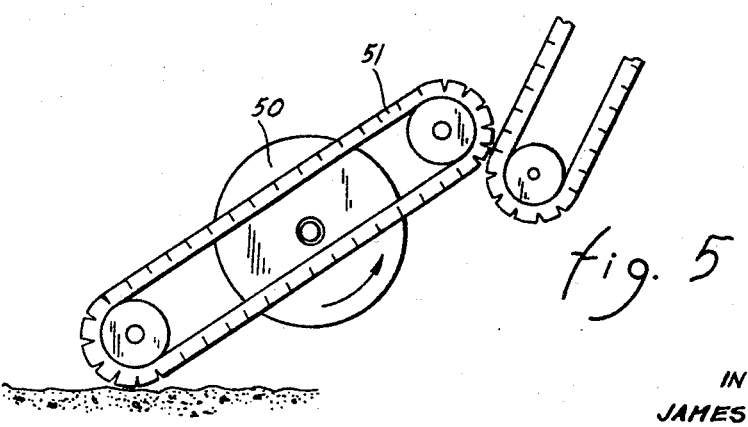
FIGURE 5 is a partial elevation illustrating a further embodiment of my invention.

FIGURE 5 is presented to illustrate the fact that the diameter of the rotatable trash-removal member may vary. In the embodiment shown therein, the trash-removal member 50 is sufficiently large to extend between the belts 51 at both the top and the bottom of the arrangement. A larger diameter trash-removal member 50 would tend to be more gentle and gradual since the angle of "lift" of trash from the belt is less steep. Furthermore, a larger diameter trash-removal member such as illustrated in FIGURE 5 may be employed between the top belt members as well as in the fashion shown. In all cases, the axis of the trash-removal member must be positioned so that the chord defined by the belt means is less than the diameter of the rotatable trash-removal member.

While discussion herein has been limited to disc-shaped rotatable trash-removal members for clarity, it is to be understood that any other desired shape may be employed. For instance, various polyhedral shapes could be employed with good results. Thickness of the rotatable trash-removal member is such that it will fit between pairs of belt members and still be sufficiently thick that a cutting edge is not presented to the trash. Flat circumferential surfaces are shown in the drawings for ease in presentation, but rounded edges may also be employed, if desired.

Further, independently rotatable trash-removal members may be employed, if desired. When rotation of the trash-removal members is independent, each member is rotated by the force applied by trash or debris thereto.

Various modifications may be made in my invention without departing from the spirit or scope thereof, and it is to be understood that I limit myself only as defined by the appended claims.

I claim:
1. In a cotton gleaner, an improved trash-removal system comprising in combination, a plurality of cotton-gripping belts mounted on pulleys, said belts positioned in parallel, spaced relationship, and a plurality of rotatable trash-removal members having substantially uninterrupted circular peripheries extending from the spaces between said belts, the sectors of said trash-removal members extending from said spaces having chords less than the diameters of said rotatable trash-removal members, whereby said rotatable trash-removal members intercept trash bridging said spaces.

2. In a cotton gleaner, an improved trash-removal system comprising in combination, a plurality of cotton-gripping belts mounted on pulleys, said belts positioned in parallel, spaced relationship, and a plurality of mutually rotatable trash-removal members having substantially uninterrupted circular peripheries extending from the spaces between said belts, the sectors of said trash-removal members extending from said spaces having chords less than the diameter of said rotatable trash-removal members, whereby said rotatable trash-removal members intercept trash bridging said spaces.

3. In a cotton gleaner, an improved trash-removal system comprising in combination, a plurality of cotton-gripping belts mounted on pulleys, said belts positioned in parallel, spaced relationship, and a plurality of mutually rotatable substantially circular trash-removal members mounted on a common shaft for rotation therewith and extending from the spaces between said belts, said belts engaging said shaft and imparting a rotary motion thereto, the sectors of said trash-removal members extending from said spaces having chords less than the diameters of said rotatable trash-removal members, whereby said rotatable trash-removal members intercept trash bridging said spaces.

4. In a cotton gleaner, an improved trash-removal system comprising in combination, a plurality of cotton-gripping belts mounted on pulleys, said belts positioned in parallel, spaced relationship, a plurality of rotatable trash-removal members having substantially uninterrupted circular peripheries extending from the spaces between said belts, the sectors of said trash-removal members extending from said spaces having chords less than the diameters of said rotatable trash-removal members, whereby said rotatable trash-removal members intercept trash bridging said spaces, and a trash-throwing member positioned adjacent said rotatable trash-removal members, thereby to throw trash removed by said rotatable trash-removal members away from said rotatable trash-removal members.

5. In a cotton gleaner, an improved trash-removal system comprising in combination, a plurality of cotton-gripping belts mounted on pulleys, said belts positioned in parallel, spaced relationship, a plurality of mutually rotatable substantially circular trash-removal members mounted on a common shaft for rotation therewith and extending from the spaces between said belts, said belts engaging said shaft and imparting a rotary motion thereto, the sectors of said trash-removal members extending from said spaces having chords less than the diameters of said rotatable trash-removal members, whereby said rotatable trash-removal members intercept trash bridging said spaces, and a trash-throwing member positioned adjacent said rotatable trash-removal members and notched to interdigitate therewith, thereby to throw trash removed by said roatable trash-removal members away from said rotatable trash-removal members.

6. In a cotton gleaner, an improved trash-removal system comprising in combination, a first and a second set of belts, each set comprising a plurality of cotton-gripping belts mounted on pulleys and positioned in parallel, spaced relationship, said first set of belts adapted to pick up cotton from the ground and transport and transfer said cotton to said second set of belts, and a plurality of rotatable trash-removal members having substantially uninterrupted circular peripheries extending from the spaces between said second set of belts, the sectors of said trash-removal members extending from said spaces having chords less than the diameters of said rotatable trash-removal members, whereby said rotatable trash-removal members intercept trash bridging said spaces.

7. In a cotton gleaner, an improved trash-removal system comprising in combination, a first and a second set of belts, each set comprising a plurality of cotton-gripping belts mounted on pulleys and positioned in parallel, spaced relationship, said first set of belts adapted to pick up cotton from the ground and transport and transfer said cotton to said second set of belts, a plurality of mutually rotatable substantially circular trash-removal members mounted on a common shaft for rotation therewith and extending from the spaces between said second set of belts, said belts engaging said shaft and imparting a rotary motion thereto, the sectors of said trash-removal members extending from said spaces having chords less than the diameters of said rotatable trash-removal members, whereby said rotatable trash-removal members intercept trash bridging said spaces, and a trash-throwing member positioned adjacent said rotatable trash-removal members and notched to interdigitate therewith, thereby to throw trash removed by said rotatable trash-removal members away from said rotatable trash-removal members.

8. In a cotton gleaner, an improved trash-removal system comprising in combination, a first and a second set of belts, each set comprising a plurality of cotton-gripping belts mounted on pulleys and positioned in parallel, spaced relationship, said first set of belts adapted to pick up cotton from the ground and transport and transfer said cotton to said second set of belts, and a plurality of rotatable trash-removal members having substantially uninterrupted circular peripheries extending from the spaces between said first set of belts, the sectors of said trash-removal members extending from said spaces having chords less than the diameters of said rotatable trash-removal members, whereby said rotatable trash-removal members intercept trash bridging said spaces.

9. In a cotton gleaner, an improved trash-removal system comprising a combination, a first and a second set of belts, each set comprising a plurality of cotton-gripping belts mounted on pulleys and positioned in parallel, spaced relationship, said first set of belts adapted to pick up cotton from the ground and transport and transfer said cotton to said second set of belts, and a plurality of mutually rotatable substantially circular trash-removal members mounted on a common shaft for rotation therewith and extending into the spaces between said first set of belts, said belts engaging said shaft and imparting a rotary motion thereto, the sectors of said trash-removal members extending into said spaces having chords less than the diameters of said rotatable trash-removal members, whereby said rotatable trash-removal members intercept trash bridging said spaces.

References Cited

UNITED STATES PATENTS

| | | | |
|---|---|---|---|
| 779,808 | 1/1905 | Schultz | 209—324 X |
| 2,136,126 | 11/1938 | Dove | 56—49 |
| 3,148,491 | 9/1964 | Warmerdam | 56—28 |

ABRAHAM G. STONE, *Primary Examiner.*

P. A. RAZZANO, *Assistant Examiner.*